(12) United States Patent
Shin

(10) Patent No.: US 7,447,175 B2
(45) Date of Patent: Nov. 4, 2008

(54) METHOD FOR PROVIDING BROADCASTING SERVICE IN COMMUNICATION SYSTEM

(75) Inventor: Yeong Jong Shin, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 1186 days.

(21) Appl. No.: 10/238,243

(22) Filed: Sep. 10, 2002

(65) Prior Publication Data

US 2003/0054799 A1 Mar. 20, 2003

(30) Foreign Application Priority Data

Sep. 20, 2001 (KR) .......................... 10-2001-58282

(51) Int. Cl.
H04Q 7/00 (2006.01)
(52) U.S. Cl. ........................ 370/331; 370/335; 455/436
(58) Field of Classification Search ................ 370/335, 370/342, 329, 330, 331, 332; 455/436
See application file for complete search history.

(56) References Cited

U.S. PATENT DOCUMENTS 5,491,718 A * 2/1996 Gould et al. ................ 370/335
5,781,860 A * 7/1998 Lopponen et al. ......... 455/426.1
5,887,252 A * 3/1999 Noneman .................... 455/463
6,091,717 A * 7/2000 Honkasalo et al. .......... 370/329

* cited by examiner

Primary Examiner—Ricky Ngo
Assistant Examiner—Dady Chery
(74) Attorney, Agent, or Firm—Lee, Hong, Degerman, Kang & Schmadeka

(57) ABSTRACT

The present invention is related to mobile communication system, and more particularly to a method of providing broadcasting service in the CDMA mobile communication system. The present invention prepares the long codes for a common broadcasting communication channel in the communication systems including at least one or more Base Transceiver Systems implementing wireless connection with terminals, the relevant service is provided/received by establishing the long code and the Walsh code in common at the Base Transceiver Systems implementing broadcasting services.

25 Claims, 3 Drawing Sheets

METHOD FOR PROVIDING BROADCASTING SERVICE IN COMMUNICATION SYSTEM

CROSS REFERENCE TO RELATED ART

This application claims the benefit of Korean Patent Application No. 2001-58282, filed on Sep. 20, 2001, which is hereby incorporated by reference in its entirety.

BACKGROUND OF THE INVENTION

1. Field of the Invention

The present invention is related to mobile communication system, and more particularly to a method of providing broadcasting program service using a common communication channel in a mobile communication system, such as the Code Division Multiple Access (CDMA) system.

2. Description of the Related Art

Generally in the CDMA mobile communication system, the relevant communication channel should be established according to the characteristics of calls to be established for receiving voice or data. A primary channel is established in case of voice call, and one or more adequate additional channels (e.g. supplemental channel(s) for data transmission) are established for data calls according to the a transmission data rate of relevant call.

When several mobile communication users want to receive, for example, a TV program, through a mobile terminal, the mobile communication system, through BTS system, must provides, each separate communication channel for several users in order to broadcast the same program to the terminal. In the conventional systems, a common communication channel in not being used for a multi-media broadcasting service (for example, television and radio programs) that can be received by a plurality of mobile stations or terminals. If each mobile terminal uses different communication channels to receive broadcasting services provided by the system, the following problems may be encountered.

First, communication resources, such as traffic channels, are wasted since the number of wireless channels must be duplicated for each mobile user desiring to utilize the same broadcasting service.

Second, when a new user desires to receive the broadcasting service, a new call setup procedure, including setting a new dedicated communication channel for such mobile station, must be processed in the conventional system. Such procedure adds call set-up related delays.

SUMMARY OF THE INVENTION

Accordingly, an object of the present invention is to provide a multi-media broadcasting service in communication systems in order to increase the efficiency in the use of communication resources upon listening to the same broadcasting or receiving the same data by using one or more common channel in mobile communication systems.

Also, the object of the present invention is to provide the broadcasting service through the communication systems, wherein a subscriber desiring to receive the broadcasting services can be connected to the network with a minimum call setup delay.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an aspect of the present invention, every terminal does not establish each communication channel between a Base Transceiver System and a Mobile Station, and establishes common forward communication channel in any cell so that each terminal receives voice or TV broadcasting as well as multimedia data via the common communication channel.

In accordance with another aspect of the invention, a method for providing the broadcasting service, wherein in the communication systems including at least one or more terminals and at least one or more Base Transceiver Systems implementing wireless connection with these terminals, comprises assigning at least one long code for providing broadcasting services, assigning at least one Walsh code in common at the Base Transceiver Systems for identifying communication channels of the broadcasting services, establishing at least one common communication channels by using the long code and Walsh code assigned, and providing/being provided with services via the established channel.

In accordance with still another aspect of the invention, a method for broadcasting service, wherein in the communication systems including at least one or more terminals, at least one or more Base Transceiver Systems implementing wireless connection with these terminals, the Mobile Switching Center (MSC) to control communication resources, the Base Station Controller to control the Base Transceiver Systems, and the Packet Data Serving Node (PDSN) for transmitting packet data, comprises assigning at least one long code for providing broadcasting services, assigning at least one Walsh code in common at the Base Transceiver Systems for identifying communication channels of the broadcasting services, establishing at least one common communication channels by using the long code and Walsh code assigned, and providing/being provided with services via the established channel.

In accordance with still another aspect of the invention, a method for broadcasting service in communication systems comprises requesting a call setup for services to the system, with the identification number of terminal and the identifier for being provided with service, by at least one or more terminals each, sending each long code corresponding to the service assigned by the system to the relevant terminal, according to the request, establishing common communication channel with the system at the terminals which have requested the same service, by using the received long code, and receiving the service via the established communication channel.

According to an embodiment of the invention, a method for providing a broadcasting service in a communication network, the broadcasting service being provided to a plurality of mobile stations by at least one base station, comprises receiving a service code associated with the broadcasting service from at least one mobile station; providing at least one long code associated with the broadcasting service, wherein the at least one long code is not associated with an identification number of the mobile station receiving the broadcasting service; providing at least one Walsh code associated with the broadcasting service; and providing at least one communication channel associated with the assigned long code and the Walsh code, the at least one communication channel being used to provide information to the plurality of mobile stations. The method further comprises authenticating whether the at least one mobile station sending the service code is an authorized mobile station; sending the long code and the Walsh code associated with the broadcasting service to the authorized mobile station; establishing a communication channel between the authorized mobile station and the at least one base station by using the long code and the Walsh code associated with the broadcasting service; and broadcasting information through the communication channel.

According to one aspect of the invention, each base station comprises at least one base transceiver system (BTS), and a plurality of BTS use the same long code and the Walsh code to provide the broadcast service. The communication channel between the authorized mobile station and a BTS is disconnected by the authorized mobile station when the strength of a pilot signal from the BTS is lower than a predetermined threshold value. Similarly, the communication channel between the authorized mobile station and a BTS is achieved by the authorized mobile station when the strength of a pilot signal from the BTS is equal to or greater than a predetermined threshold value.

According to another aspect of the invention, when a destination call is arrived at the authorized mobile station receiving the broadcasting service, the destination call has a priority over the broadcasting service. Preferably, the authorized mobile station periodically monitors a paging channel for the destination call.

According to one aspect of the invention, the at least one communication channel is for forward link only. Preferably, when providing the broadcasting service, a forward link power control is being inhibited by the base station to optimize the reception of the broadcasting service by the plurality of mobile stations.

According to another aspect of the invention, the long code corresponds to at least one electronic serial number (ESN) not associated with the plurality of mobile stations. Also, it is desirable to periodically change the long code.

According to another embodiment of the invention, a method for receiving a broadcasting service in a mobile station in a communication network, comprises sending a service code associated with the broadcasting service from at least one mobile station; receiving from the base station at least one long code associated with the broadcasting service, wherein the at least one long code is not associated with an identification number of the mobile station receiving the broadcasting service; receiving from the base station at least one Walsh code associated with the broadcasting service; and using the long code and the Walsh code received from the base station, connecting to the base station through at least one communication channel associated with the assigned long code and the Walsh code, wherein the at least one communication channel being used to receive broadcast information.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

The preferred embodiment of the present invention is preferably applied to all systems using Code Division Multiple Access CDMA mobile communication technology, such as Digital Cellular System (hereinafter called as 'DCN'), Personal Communication System (hereinafter called as 'PCS'), Wireless Local Loop System, and IMT-2000 System.

The preferred embodiment of the present invention provides a multi-media broadcasting services by using at least one common communication channel according to desired bearer service by using, for example, layer 3 control procedure, by not assigning separate common communication channels reserved by the physical or other layers of existing DCN/PCS, CDMA mobile communication system, and IMT-2000 system with synchronized communication protocol.

The present invention is preferably applied during a call setup procedure performed by one or more of the following devices, such as mobile stations (MS), Base Transceiver Systems (BTS) and Base Station Controllers (BSC), and Mobile Switching Centers (MSC).

Hereinafter, the configuration and operation according to the preferred embodiments of the present invention is described with reference to the drawings enclosed herewith.

Figure 1:
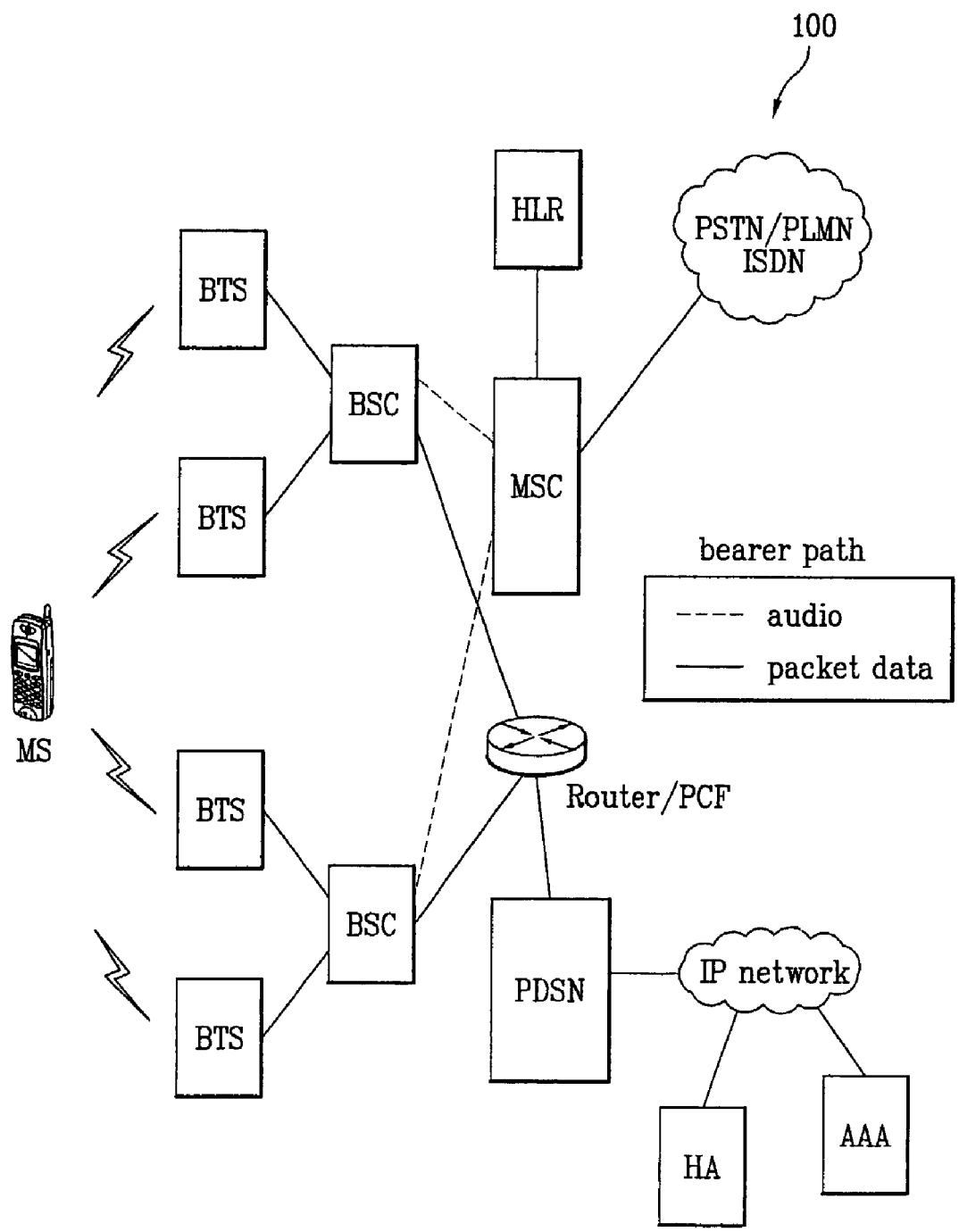
FIG. 1 is a diagram generally showing the CDMA communication system.

FIG. 1 is a diagram generally illustrating the CDMA communication system. Referring to FIG. 1, the CDMA communication system 100 comprises the mobile stations (MS) as user terminal, BTS that wirelessly interfaces with the MS, the BSC controlling the BTSs and coding/decoding voice packets, the MSC responsible for switching calls and assigning wireless resources by translating the mobile subscriber's identifier (for example, mobile station telephone numbers), the Home Location Register (HLR) confirming whether the MS is a valid device and registering the location of the MS if the MS is valid.

The BSC is equipped with a selector and a vocoder. The selector is primarily and generally responsible for call process, hand-off, and power control. The vocoder is responsible for converting a voice signal into PCM data and transmitting it to the MSC.

The CDMA communication system 100 further comprises a Packet Data Serving Node (PDSN) for packet data service to/from the MS, an AAA for performing authentication, authorization and accounting of the MS having Mobile IP (Mobile Internet Protocol) in the packet data network, and a Home Agent for registering the Mobile IP. The BSC may also include a Packet Control Function for Packet Data Communication Service. The PDSN is preferably located between the BSC and the packet data network, and connects the MSs by PPP (Point-to-Point Protocol), and routes the packets.

The MSC is connected to the Public Switching Telephone Network, Public Land Mobile Network, Integrated Services Digital Network and others. Therefore, the CDMA communications system can provide the MSs with voice service.

The preferred embodiment of the present invention requires the following conditions in order to provide broadcasting services using at least one common communication channel. First, for providing the broadcasting services, the system terminates the operation of a reverse communication channel (i.e., a communication link from the MS to the BTS). The MS and BTS terminate operating a reverse communication channel to increase the system capacity for the wireless channel during the broadcasting services.

Second, for providing the broadcasting services using at least one common communication channel, the system preferably terminates power control protocol. Because various mobile users are present at different locations within a cell, the highest, or substantially close thereto, forward power threshold should be applied to maintain the optimum forward link condition.

Third, for providing the broadcasting services, the mobile terminal changes the type of hand-off protocol. This is necessary to service those mobile terminals moving from one cell to another cell. For the broadcasting channel to be used by many mobile users, each MS' hand-off that uses existing soft hand-off method becomes substantially inoperable. Therefore, a new type of hand-off modifying the idle hand-off should be used.

Fourth, the service code (or service identifier) should be designated. In other words, the service code of common communication channel for the broadcasting services should be designated. Therefore, the MS requesting the broadcasting services tries a call setup with the system by inputting at least one service code represented by, for example, 2 or 3 alphanumeric values, which is identical to appended service code assignment. The destination number is inputted as such service code, and the system (for example, MSC) translates it and recognizes the relevant broadcasting service.

Also, the preferred embodiment of the present invention reserves the Electronic Serial Numbers (ESN) for generating the long or LN codes. The ESNs are preferably of those mobile stations not being registered or used in the cells where the broadcast service is being supported. Alternatively, the ESN numbers may also be internally and randomly generated by the system. And plural long codes (MS identification code) for each service, which are corresponding to these ESN's and used in forward common communication channel, are generated in advance or as the program is being broadcast. The long codes are preferably managed by the MSC or the HLR when the broadcasting service is requested by the MS. The MSC or HLR assigns the generated long code for the relevant broadcasting service and send it to the authorized MS. A plurality of long codes for each type of service is generated because unauthorized MS may be introduced in the system in the event that a single long code is being used.

According to the preferred embodiment of the present invention, by periodically changing the long codes corresponding to any one of the ESNs and reserving several ESNs, the unauthorized MS are prevented from utilizing or receiving the broadcasting service.

Since the ESN is used as a key to generate the long code for conventional terminal identifier, the present invention uses the ESN not in use by the subscriber's terminal in order to generate plural long codes regarding each type of service for broadcasting services.

Figure 2:
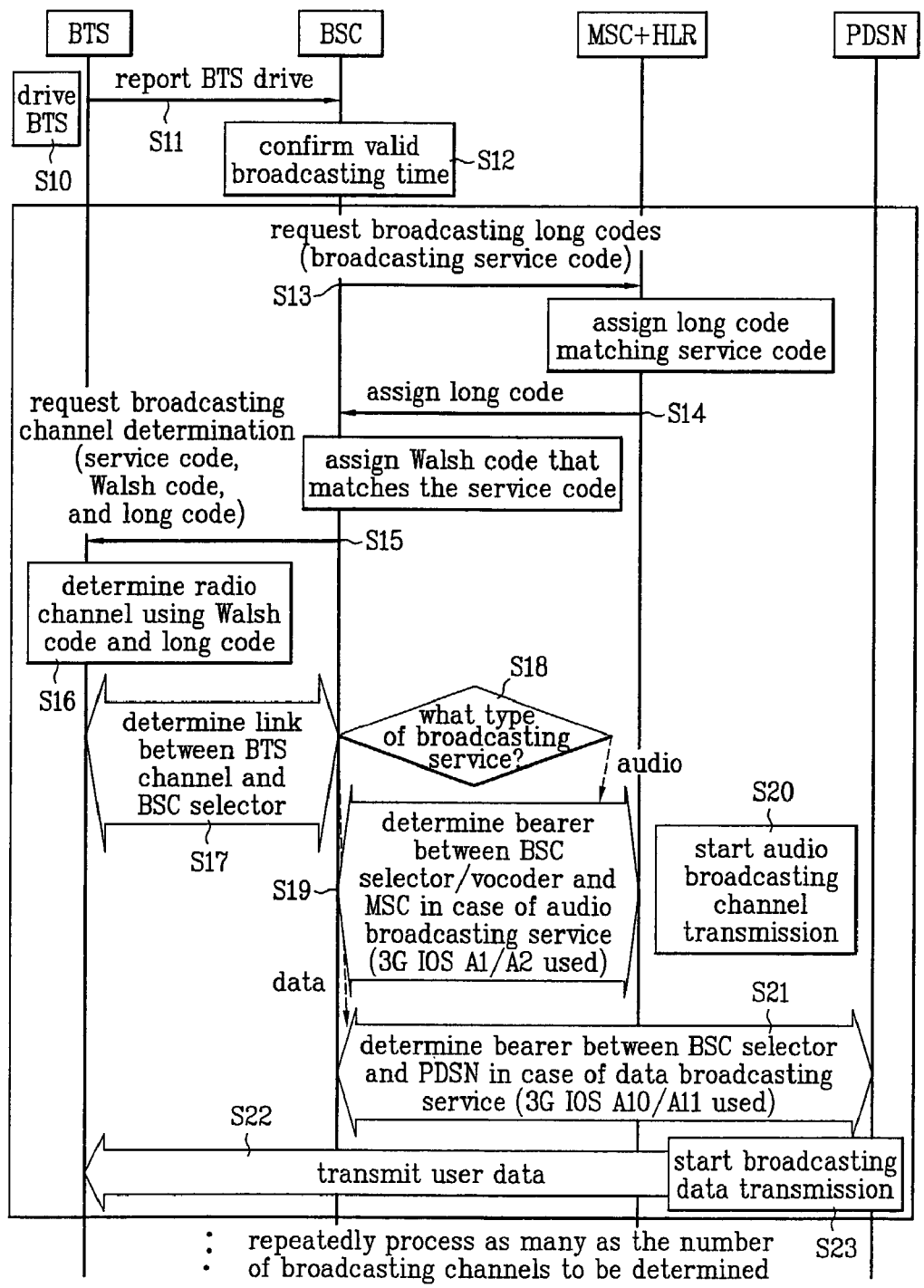
FIG. 2 is a diagram showing the procedure for setting up a common broadcasting communication channel according to a preferred embodiment of the present invention.

FIG. 2 is a diagram illustrating the procedures for setting up a common broadcasting communication channel according to the preferred embodiment of the present invention. At least one common communication channel for broadcasting services is established when all BTSs are initially driven to be served.

Referring to FIG. 2, the BTS is driven (S10), and when a message reporting the BTS' driving is received (S11), the BSC confirms whether it is a valid time to provide broadcasting service (S12).

If it is time to provide the broadcasting service, the BSC requests for assignment of a long code for broadcasting service corresponding to the service code to be served (service identifier) to the MSC (S13).

The MSC confirms the service code, and assigns the long code corresponding to the relevant broadcasting service. The assigned long code information is then provided to the BSC (S14). The long code is used for identifying the broadcasting service desired by a particular MS.

The BSC receiving the long code information from the MSC designates a Walsh code to be assigned to the relevant broadcasting service. The BSC transmits a message requesting for channel setup used for the broadcasting service and provides the Walsh code and the long code to the BTS (S15). The Walsh code is an orthogonal code being used by MS to identify each channel transmitted from BTS in forward link.

The BTS establishes a wireless communication channel for the broadcasting service with the Walsh code and the long code (S16). The BTS preferably transmits the Null data to the MS requesting the service via established broadcasting channel. The BTS is in the initial state for providing the real data for the broadcasting service.

Also, the BTS establishes a communication link between the BTS channel and the BSC selector (S17).

After the setup of a communication link, the BSC confirms the type of broadcasting service (S18). According to the type of service, the BSC determines the bearer path for either voice or data communication. For example, the voice is used for broadcasting an audio program, and the data is used for broadcasting a video (with or without audio) program.

For the voice broadcasting service, the voice bearer path between the BSC selector/vocoder and the MCS is established by using such standard as 3G IOS A1/A2 (S19). However, other suitable voice communication standards known to one of ordinary skill in the art may also be used.

For the data broadcasting service, the data bearer path between the BSC selector and the PDSN is established by using such standard as 3G IOS A10/A11 (S21). However, other suitable data communication standards known to one of ordinary skill in the art may also be used.

Although the MS for receiving the broadcasting services may not yet be determined, when the bearer paths are established, the BTS transmits the data received from PDSN (S23) so that authorized MS can receive such information.

After the message reporting BTS' driving is transmitted, the system including the BTS, BSC, MSC, HLR and PDSN repeats the operation from steps S11 to S23 to establish different broadcasting channels as needed.

As shown in FIG. 2, the system (or a base station) performs the illustrated steps to set up one or more broadcasting services to be received by authorized MS requesting such services. The authorized MS then receives such services as illustrated in FIG. 3.

Figure 3:
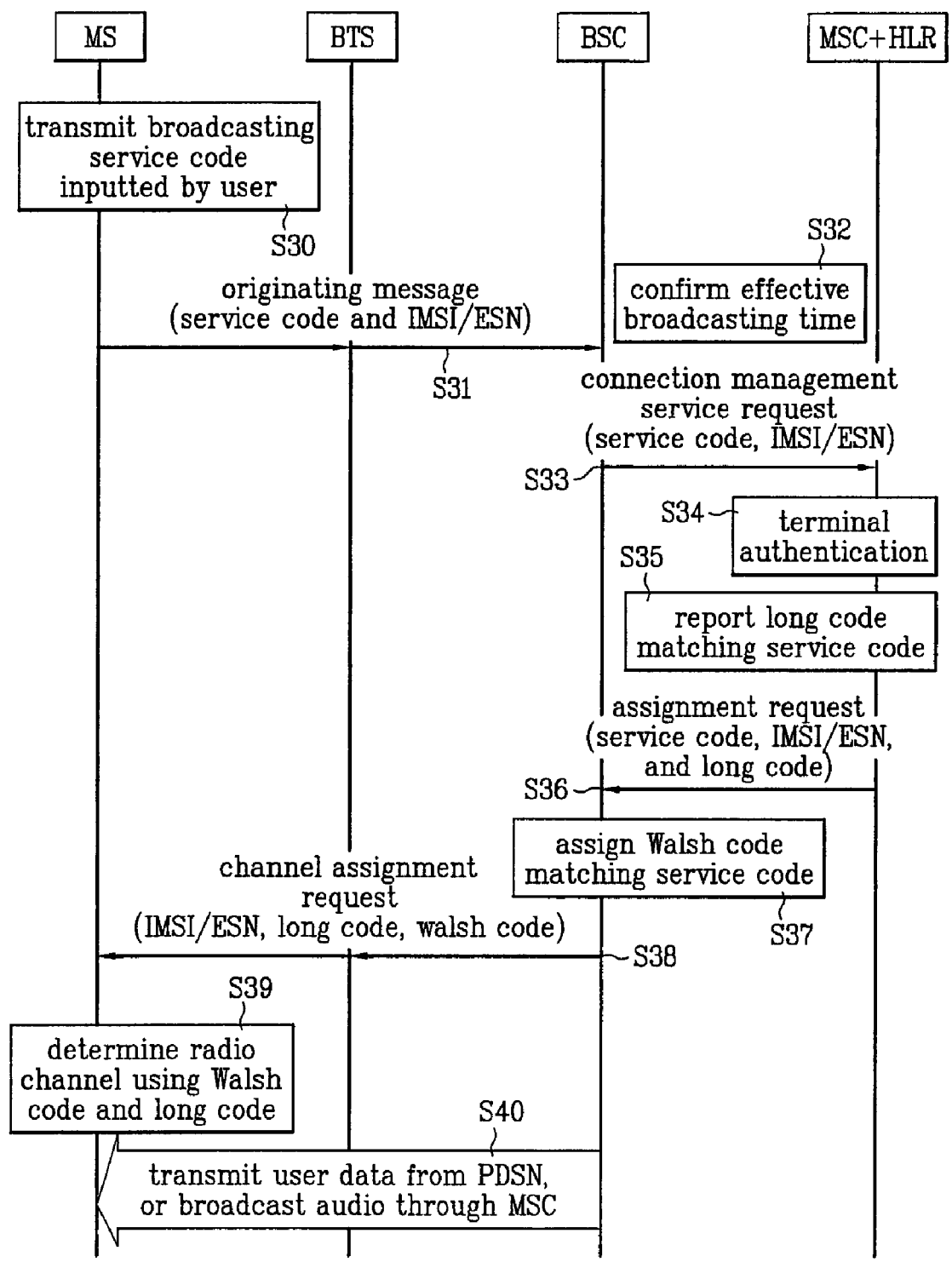
FIG. 3 is a diagram showing the procedure for setting up a common broadcasting communication channel for mobile terminals according to the preferred embodiment of the present invention.

FIG. 3 is a diagram showing the procedure for setting up a common broadcasting communication channel for mobile terminals according to the preferred embodiment of the present invention.

The user of MS who wants to receive a broadcasting service inputs the desired broadcasting service code wanted as an identification number. For example, if a broadcasting service code associated with NBC is designated as a code 123, then the user inputs the numbers 123 in the MS and transmits such code to the system.

The MS transmits an originating message with the broadcasting service code to the BTS, and a call setup for the broadcasting service is requested (S30). This originating message from the MS includes the IMSI (International Mobile Subscriber Identifier)/ESN as well as the broadcasting service code. The originating message is transmitted to the BTS via an access channel. The BTS, which has received the originating message from the MS, transmits it to the BSC (S31).

The BSC, which has received the originating message, confirms a valid time for providing the requested broadcasting service (S32). If the requested is not within the valid broadcasting time, then the BSC rejects or ignores the call setup for the originating message. The system may transmit the valid broadcasting time information to the MS requesting call setup by using such services as Short Message Service (SMS), or any other suitable data transmission services.

If the request is received within the valid broadcasting time, the BSC transmits a message to MSC requesting a Connection Management, which is the standard message of 3G IOS A1 (S33). The message requesting for Connection Management includes the IMSI and ESN for MS authentication, and the service code.

The MSC, preferably with the HLR, performs the authentication of the MS requesting the broadcasting service (S34). The MSC then transmits a message requesting for assignment and loading the long code corresponding to the broadcasting service to the BSC (36).

The message requesting the assignment includes the service code information, IMSI/ESN and long code.

The BSC receiving the assignment request message selects a Walsh code, which is assigned for the particular broadcasting service (S37). The BSC then transmits the assigned Walsh code and the long code to the BTS by loading such information in the channel assignment request message. Preferably, the channel assignment request message also includes the IMSI/ESN. The BTS receiving the channel assignment request transmits all of the received information, comprising a long code, Walsh code, IMSI/ESN and frame offset, etc., which are required for existing call setup, via a paging channel to the relevant MS requesting for the broadcasting service (S38). Alternatively, other channels may also be used to notify the MS requesting the broadcasting services without deviating from the gist of the present invention.

A conventional MS uses the long code generated by using its own ESN. However, the preferred embodiment of the present invention uses the long code received from the system.

The authorized MS receiving the long code, Walsh code, IMSI/ESN, etc. acquires a wireless channel, that is, a common communication channel for receiving the desired broadcasting service (S39). Then, the MS receives the broadcast data from the PDSN, or receives voice broadcasting provided by the MSC (S40).

Because the MS is not fixed in one location while receiving either the broadcast voice or data from the system, a proper hand-off must be accomplished when, for example, the MS moves from one cell to an adjacent cell. To accomplish this task, the authorized MS performs the following operations.

If the broadcasting service were not served by a specific BTS, but served by all nearby BTSs, the hand-off operation is managed in the following manner.

First, according to the preferred embodiment of the present invention, the broadcasting communication channel established at all BTSs (or selected BTSs) uses the same frequency, the same Walsh code and the same long code. Therefore, the MS need not perform the MAHO (Mobile Assisted Handoff), which is a conventional hand-off method performed in conjunction with the system. In the preferred embodiment of the invention, the MS performs the hand-off independently for the broadcasting channel service as follows.

The Neighbor List of the BTS and hand-off thresholds (T-ADD, T-DROP) used for the hand-off operation, uses the value transmitted to the MS as it is, for a typical hand-off.

To acquire a BTS during hand-off, the MS periodically checks the strength of neighbor pilot signals. When the strength of the neighbor pilot signal reaches the adding threshold of the hand-off (T-ADD), the MS acquires the same broadcasting channel of the neighboring pilot signals reaching or exceeding the adding threshold as the common broadcasting communication channel. That is, the MS includes the new BTS transmitting the pilot signal that reached or exceeded the adding threshold (T-ADD) as an active set. Then the MS receives the broadcasting service provided by such BTS.

To drop a BTS during hand-off, the MS periodically checks the strength of the neighbor pilot signals. When the strength of the neighbor pilot signals reaches a dropping threshold (T-DROP) of the hand-off, the MS excludes such BTS from the active set by withdrawing the same broadcasting communication channel from the list of neighboring pilot signals. That is, the MS removes the BTS transmitting the pilot signal that corresponds to the dropping threshold (T-DROP) from the active set. The MS does not receive the broadcasting service provided by such BTS.

Since the operating channel for receiving the voice and data at the MS is a broadcasting channel, as in the conventional method, the channel resource is not wasted.

While receiving the broadcasting service from the system, the MS can recognize a typical destination call by periodically monitoring the paging channels. Upon arrival of a typical destination call at the MS, the MS establishes the voice destination call on the preferential basis.

As described above, when common broadcasting communication channel service is applied by using this invention, the following benefits may be achieved.

First, since the same single communication channel is used as a forward communication channel, no additional communication channels are required even when the number of mobile subscribers requesting the broadcasting services increases. It is possible to connect infinite number of MSs per sector or cell within the signaling processing capacity of the access channels and paging channels.

Second, the set up and operating procedure for practicing the present invention may be accomplished without any hardware alterations. Instead, a minor software change in the MS and the mobile communication system (BTS/BSC/MSC), for example at the call processing set up applicable to the layer 3 protocol, is only needed.

Third, since the common broadcasting service according to the invention makes a call setup with the service code corresponding to the bearer service provided by voice or all data services, it can be used for any systems or all kinds of broadcasting communication services.

Fourth, a specific frequency can be assigned separately for broadcasting services, and several number of voice and various data broadcasting service can be established and served within that frequency.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD- ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. Of course, those skilled in the art will recognize that many modifications may be made to this configuration without departing from the scope of the present invention, and that the article of manufacture may comprise any information bearing medium known in the art.

While specific embodiments of the present invention are described with respect to a CDMA type of cellular system, it should be understood that the present invention may be applied also to other cellular systems including TDMA type cellular system. Although in the present system, BTS, BSC and MSC are described as a separate functional entity, the associated functions may be implemented in other entities.

As herein disclosed, it will be understood by those skilled in the art that various changes and modifications may be made without departing from the spirit and scope of this invention. Therefore, the technical scope of the present invention will not be restricted to the preferred embodiments disclosed herewith, but it should be specified by the scope of claims enclosed herewith.

What is claimed is:

1. A method for providing a broadcasting service in a communication network, the broadcasting service being provided to a plurality of mobile stations by at least one base station, the method comprising:

terminating a communication channel supporting communication in a first direction from a plurality of mobile stations to a base station to increase bandwidth needed to support broadcasting services in a second direction from the base station to the plurality of mobile stations;

terminating power control protocols utilized to request a mobile station to adjust transmission power when communicating in the first direction;

switching a process for handing off the mobile terminal from one base station to another base station so that instead of a soft hand off an idle hand off process is utilized;

requesting assignment of at least one long code associated with a broadcasting service to which a mobile station has subscribed, in response to the mobile station sending a service code designating the broadcasting service a user of the mobile station wishes to receive, wherein the at least one long code is unique to the mobile station receiving the broadcasting service and a plurality of long codes are generated independent of an identification number uniquely assigned to the mobile station, wherein the plurality of long codes designated a plurality of different types of service supported by the broadcasting service;

providing at least one Walsh code associated with the broadcasting service to the mobile station to identify a type of broadcasting service being provided to the mobile station;

determining a bearer path for either voice or data communication according to the type of broadcasting service identified; and providing the broadcasting service on at least one communication channel identified by the assigned long code and the Walsh code, the at least one communication channel being commonly used by a plurality of mobile stations to receive said broadcasting service.

2. The method of claim 1, further comprising:
authenticating whether the at least one mobile station sending the service code is an authorized mobile station;

sending the long code and the Walsh code associated with the broadcasting service to the authorized mobile station;

establishing a communication channel between the authorized mobile station and the at least one base station by using the long code and the Walsh code associated with the broadcasting service; and broadcasting information through the communication channel.

3. The method of claim 2, wherein each base station comprises at least one base transceiver system (BTS), and a plurality of BTS use the same long code and the Walsh code to provide the broadcast service.

4. The method of claim 3, wherein the communication channel between the authorized mobile station and a BTS is disconnected by the authorized mobile station when the strength of a pilot signal from the BTS is lower than a predetermined threshold value.

5. The method of claim 3, wherein the communication channel between the authorized mobile station and a BTS is achieved by the authorized mobile station when the strength of a pilot signal from the BTS is equal to or greater than a predetermined threshold value.

6. The method of claim 4, wherein the communication channel between the authorized mobile station and a BTS is disconnected by the authorized mobile station independent of the base station.

7. The method of claim 5, wherein the communication channel between the authorized mobile station and a BTS is achieved by the authorized mobile station independent of the base station.

8. The method of claim 2, wherein a destination call is arrived at the authorized mobile station receiving the broadcasting service, the destination call has a priority over the broadcasting service.

9. The method of claim 8, wherein the authorized mobile station periodically monitors a paging channel for the destination call.

10. The method of claim 1, wherein the at least one communication channel is for forward link only.

11. The method of claim 1, wherein when providing the broadcasting service, a forward link power control is being inhibited by the base station to optimize the reception of the broadcasting service by the plurality of mobile stations.

12. The method of claim 1, wherein the long code corresponds to at least one electronic serial number (ESN) not associated with the plurality of mobile stations.

13. The method of claim 12, wherein the long code is periodically changed.

14. The method of claim 1, wherein the long code is periodically changed.

15. The method of claim 1, wherein upon receiving the service code associated with the broadcasting service from at least one mobile station, the base station determines a valid time for providing the broadcasting service.

16. A method for providing a broadcasting service in a communication network, the broadcasting service being provided to a plurality of mobile stations by at least one base station, the method comprising:

terminating a communication channel supporting communication in a first direction from a plurality of mobile stations to a base station to increase bandwidth needed to support broadcasting services in a second direction from the base station to the plurality of mobile stations;

terminating power control protocols utilized to request a mobile station to adjust transmission power when communicating in the first direction;

switching a process for handing off the mobile terminal from one base station to another base station so that instead of a soft hand off an idle hand off process is utilized;

receiving a service code from at least one mobile station designating a broadcasting service a user of the mobile station wishes to receive;

requesting assignment of at least one long code associated with the broadcasting service the long code being unique to each mobile station in the communication network to at least one mobile station, wherein the long code is not derived from an identification number associated with the mobile station;

providing at least one Walsh code to identify a type of broadcasting service being provided to the mobile station;

determining a bearer path for either voice or data communication according to the type of broadcasting service identified; and providing the broadcasting service on at least one communication channel identified by the assigned long code and the Walsh code, the at least one communication channel being commonly used by said plurality of mobile stations so that the base station may provide broadcast information to the plurality of mobile stations.

17. The method of claim 16, wherein the at least one long code is not associated with an identification number of the mobile station.

18. The method of claim 16, wherein the long code is periodically changed.

19. A method for receiving a broadcasting service in a mobile station in a communication network comprising a plurality of mobile stations, the broadcasting service being provided to at least one mobile station by at least one base station, the method comprising:

receiving from the base station at least one long code associated with the broadcasting service, the long code being unique to each mobile station in the communication network, wherein the at least one long code is not associated with an identification number of the mobile station receiving the broadcasting service;

receiving from the base station at least one Walsh code to identify a type of broadcasting service being provided to the mobile station; and using the long code and the Walsh code received from the base station, connecting to the base station through at least one communication channel associated with the assigned long code and the Walsh code, wherein the at least one communication channel is commonly used by said plurality of mobile stations to receive broadcast information, wherein terminating a communication channel supporting communication in a first direction from a plurality of mobile stations to a base station to increase bandwidth needed to support broadcasting services in a second direction from the base station to the plurality of mobile stations;

wherein power control protocols utilized to request a mobile station to adjust transmission power when communicating in the first direction are terminated;

wherein a process for handing off the mobile terminal from one base station to another base station is switched so that instead of a soft hand off an idle hand off process is utilized; and wherein a bearer path for either voice or data communication is determined according to the type of broadcasting service identified.

20. The method of claim 19, wherein each base station comprises at least one base transceiver system (BTS), and a plurality of BTS use the same long code and the Walsh code to provide the broadcast service.

21. The method of claim 20, wherein the communication channel between the mobile station and a BTS is disconnected by the mobile station when the strength of a pilot signal from the BTS is lower than a predetermined threshold value.

22. The method of claim 20, wherein the communication channel between the mobile station and a BTS is achieved by the mobile station when the strength of a pilot signal from the BTS is equal to or greater than a predetermined threshold value.

23. The method of claim 20, further comprising
when a destination call is arrived at the mobile station receiving the broadcasting service, the destination call has a priority over the broadcasting service.

24. The method of claim 23, wherein the mobile station periodically monitors a paging channel for the destination call.

25. The method of claim 19, further comprising the step of the mobile station sending a service code associated with the broadcasting service.

* * * * *